US010711831B2

(12) United States Patent
Bullard

(10) Patent No.: US 10,711,831 B2
(45) Date of Patent: Jul. 14, 2020

(54) FLEXURAL PIVOT

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 507 days.

(21) Appl. No.: 15/448,524

(22) Filed: Mar. 2, 2017

(65) Prior Publication Data

US 2018/0252260 A1 Sep. 6, 2018

(51) Int. Cl.
*F16C 11/04* (2006.01)
*F16C 11/12* (2006.01)

(52) U.S. Cl.
CPC .......... *F16C 11/12* (2013.01); *F16C 2326/47* (2013.01); *F16C 2370/20* (2013.01); *Y10T 403/45* (2015.01); *Y10T 403/54* (2015.01)

(58) Field of Classification Search
CPC .. F16C 11/12; F16C 2370/20; F16C 2326/47; Y10T 403/45; Y10T 403/54; F16D 3/005
See application file for complete search history.

(56) References Cited

U.S. PATENT DOCUMENTS 2,931,092 A 4/1960 Humphrey
3,142,888 A * 8/1964 Troeger .................. F16C 11/12 267/160
3,181,918 A 5/1965 Troeger
3,319,951 A * 5/1967 Seelig .................... B21D 53/00 267/160
3,465,997 A 9/1969 Piske
3,544,175 A * 12/1970 Tooker .................... F16C 11/12 403/291
3,811,665 A * 5/1974 Seelig ..................... F16C 11/12 267/160
3,844,022 A * 10/1974 Kutash .................... F16C 11/12 29/416

(Continued)

FOREIGN PATENT DOCUMENTS

DE 2344304 A1 3/1974
DE 2454811 A1 * 5/1976 ............. F16D 3/005

(Continued)

OTHER PUBLICATIONS

International Search Report for International Application No. PCT/US2017/065870 dated Feb. 8, 2018, 15 pages.

(Continued)

*Primary Examiner* — Matthew R McMahon

(57) ABSTRACT

A flexural pivot can include a plurality of flexure support members, each flexure support member having a plurality of flexure openings defined at least partially by a cantilevered extension portion. The flexural pivot can also include at least one flexure to rotatably couple the plurality of flexure support members to one another. The at least one flexure can have first and second flexible blades arranged in a cross configuration. The first and second flexible blades can be disposed in the flexure openings of the flexure support members, and the cantilevered extension portions, at least in part, can couple the first and second flexible blades to the flexure support members.

20 Claims, 7 Drawing Sheets

(56) References Cited

U.S. PATENT DOCUMENTS

| | | | | |
|---|---|---|---|---|
| 4,261,211 | A * | 4/1981 | Haberland | B23H 9/00 267/160 |
| 4,297,904 | A * | 11/1981 | Morton | F16C 11/12 29/434 |
| 4,533,100 | A | 8/1985 | Paseri | |
| 4,571,988 | A * | 2/1986 | Murphy, Jr. | G01N 11/14 73/54.33 |
| 4,640,640 | A * | 2/1987 | Herrington | F16C 11/12 403/291 |
| 4,768,702 | A | 9/1988 | Takahashi et al. | |
| 4,802,784 | A | 2/1989 | Brooks | |
| 5,061,107 | A | 10/1991 | Brooks | |
| 5,620,169 | A | 4/1997 | Payne | |
| 6,283,666 | B1 * | 9/2001 | Genequand | F16C 11/12 403/119 |
| 6,365,252 | B1 * | 4/2002 | Ortiz | F16C 11/12 156/250 |
| 6,666,612 | B2 | 12/2003 | Lorigny et al. | |
| 7,296,481 | B2 * | 11/2007 | Kahle | G01F 1/80 73/856 |
| 7,665,371 | B2 * | 2/2010 | Mastinu | F16C 11/12 73/760 |
| 8,556,533 | B2 * | 10/2013 | Bullard | F16C 11/12 403/291 |
| 2002/0084563 | A1 | 7/2002 | Lorigny et al. | |
| 2009/0173170 | A1 * | 7/2009 | Mastinu | G01L 3/22 73/862.381 |
| 2013/0129407 | A1 | 5/2013 | Bullard | |

FOREIGN PATENT DOCUMENTS

| | | | | |
|---|---|---|---|---|
| EP | 1887398 | A1 | 2/2008 | |
| FR | 2446952 | A1 | 8/1980 | |
| GB | 1427170 | A * | 3/1976 | F16D 3/005 |
| JP | 1974-132433 | A | 12/1974 | |

OTHER PUBLICATIONS

Meline, Universal beam steering mirror design using the cross blade flexure, SPIE, 1992, p. 424-442, vol. 1697.

Troeger, Considerations in the Application of Flexural Pivots, Automatic Control Data Systems Engineering, Nov. 1962, 6 pages, vol. 17 No. 4.

International Search Report for International Application No. PCT/US2017/065856 dated Feb. 7, 2018, 17 pages.

Merriam-Webster, space, entry for the word, https://www.merriam-webster.com/dictionary/space, retrieved on Dec. 2, 2019, 15 pages, retrieved from https://www.merriam-webster.com/dictionary/space.

* cited by examiner

FLEXURAL PIVOT

BACKGROUND

Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
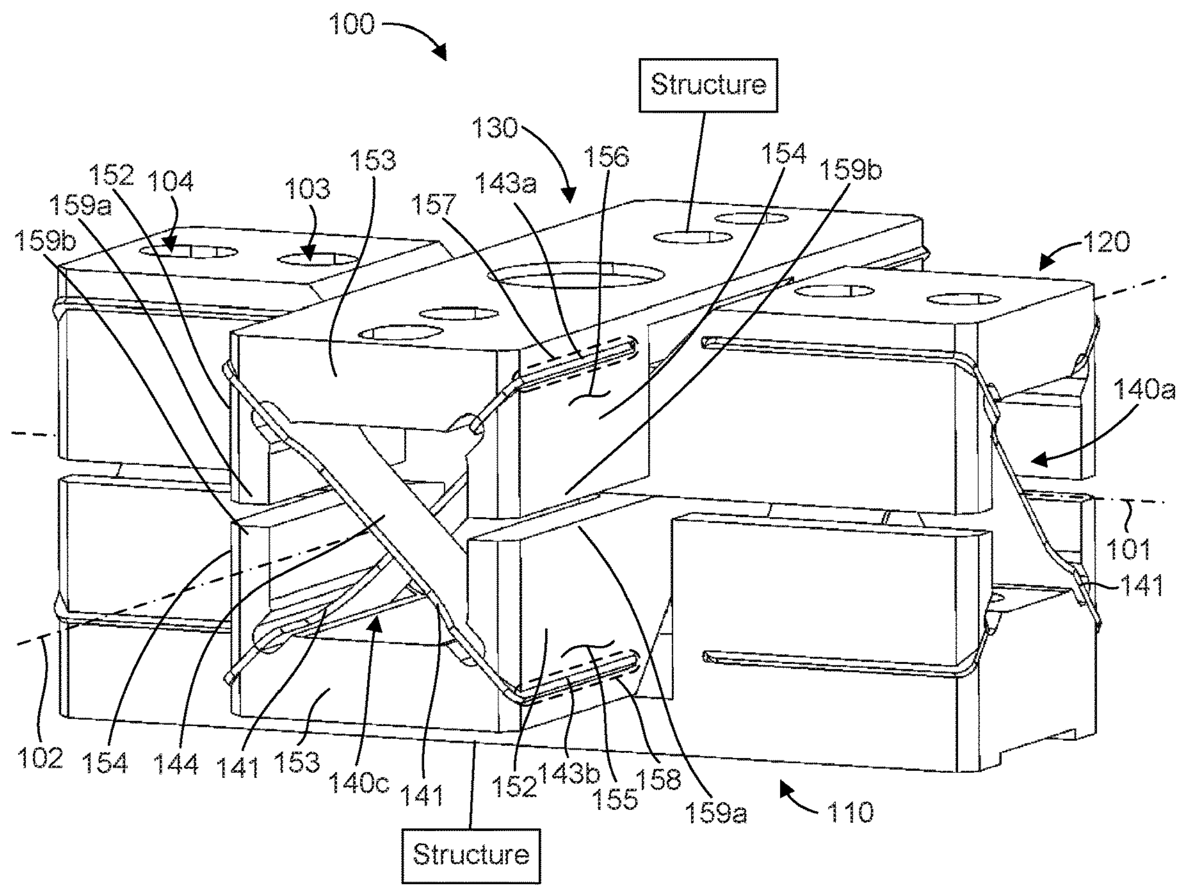
FIG. 1A is an illustration of a flexural pivot in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

A variety of flexural pivots are commercially available for variety of applications. Common problems with typical commercial off-the-shelf (COTS) flexural pivots are repeatable performance and reliability, particularly where high performance and durability are required for the application. This may be due to the difficulty in manufacturing flexural pivots in a commercially viable manner. Additionally, applications that require relatively large angular ranges of motion may cause stresses that exceed the strength of COTS flexural pivots. Thus, it is desirable to develop a flexural pivot design that provides high performance, large angular travel, and reliability while being relatively simple and cost-effective to produce.

Accordingly, a flexural pivot is disclosed that can provide high performance, large range of motion, and reliability and that is readily able to be manufactured. The flexural pivot can include a plurality of flexure support members, each flexure support member having a plurality of flexure openings defined at least partially by a cantilevered extension portion. The flexural pivot can also include at least one flexure to rotatably couple the plurality of flexure support members to one another. The at least one flexure can have first and second flexible blades arranged in a cross configuration. The first and second flexible blades can be disposed in the flexure openings of the flexure support members, and the cantilevered extension portions, at least in part, can couple the first and second flexible blades to the flexure support members.

In one aspect, a flexural pivot precursor is disclosed. The flexural pivot precursor can comprise a plurality of flexure support members, each flexure support member having a plurality of flexure openings extending through outer side surfaces of the flexure support members. The flexural pivot precursor can also include at least one flexure to rotatably couple the plurality of flexure support members to one another. The at least one flexure can have first and second flexible blades arranged in a cross configuration. The first and second flexible blades can be disposed in the flexure openings of the flexure support members such that ends of the flexible blades are exposed through the outer side surfaces of the flexure support members.

A flexural pivot manufacturing system is also disclosed. The system can comprise a fixture having a bottom support and a top support coupled to the bottom support. The system can also comprise a plurality of flexural pivot support member workpieces coupled to the fixture. The plurality of flexural pivot support member workpieces can include a first flexural pivot support member workpiece supported by and coupled to the bottom support, and a second flexural pivot support member workpiece supported by and coupled to the top support. The top and bottom supports can facilitate formation of flexure openings extending through outer side surfaces of the flexural pivot support member workpieces to form flexure support members. The top and bottom supports can also facilitate disposing at least one flexure in the flexure openings. In addition, the top and bottom supports can facilitate coupling the at least one flexure to the flexure support members to provide for rotational movement of the flexure support members relative to one another. The at least one flexure can have first and second flexible blades arranged in a cross configuration, and ends of the flexible blades can be exposed through the outer side surfaces of the flexure support members.

In addition, a method for making a flexural pivot is disclosed. The method can comprise coupling a plurality of flexural pivot support member workpieces to a fixture, wherein a first flexural pivot support member workpiece is coupled to a bottom support of the fixture, and a second flexural pivot support member workpiece is coupled to a top support of the fixture. The method can also comprise coupling the top and bottom support to one another. The method can further comprise forming flexure openings in the plurality of flexural pivot support member workpieces that extend through outer side surfaces of the flexural pivot support member workpieces to form a plurality of flexure support members. The method can even further comprise disposing at least one flexure in the flexure openings of the plurality of flexure support members to rotatably couple the plurality of flexure support members to one another, wherein the at least one flexure has first and second flexible blades arranged in a cross configuration and ends of the flexible blades are exposed through the outer side surfaces of the flexure support members. Additionally, the method can comprise coupling the at least one flexure to the flexure support members.

Figure 1B:
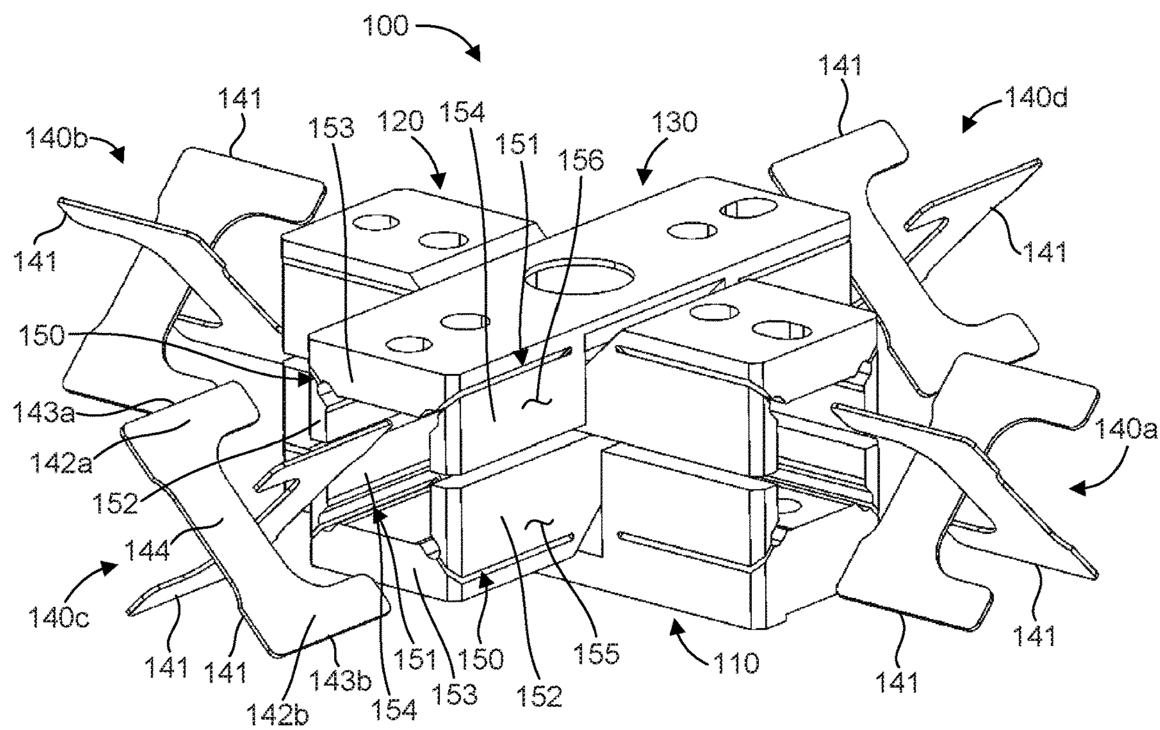
FIG. 1B is an exploded view of the flexural pivot of FIG. 1A.

One embodiment of a flexural pivot 100 is illustrated in FIGS. 1A and 1B. The flexural pivot 100 can comprise flexure support members rotatably coupled to one another. For example, the flexural pivot 100 can include a first flexure support member 110, a second flexure support member 120 rotatably coupled to the first flexure support member 110 for relative rotation about a first axis 101, and a third flexure support member 130 rotatably coupled to the second flexure support member 120 for relative rotation about a second axis 102. The axes 101, 102 can be orthogonal. Although three flexure support members are illustrated, it should be recognized that a flexural pivot can include only two flexure support members coupled to one another for relative rotation about only a single axis.

The flexural pivot 100 can be coupled to external structures to facilitate relative rotation of the structures about the axes 101, 102. For example, the flexural pivot 100 can be coupled to and utilized with fast steering mirrors, which are commonly used in electro-optical sensors, directed energy systems, long range laser communications systems, transmit and receive modules, telescopes, or other precision optics applications, and therefore may be included in laboratory-based systems, airborne line of sight stabilization systems, satellites, cameras, etc. Thus, one structure can be an optical bench of an electro-optical sensor, and the other structure can be a mirror. The external structures can be coupled to the first and third flexure support members 110, 130 utilizing coupling interfaces such as openings or holes 103 (which can be threaded), slots 104, pins, studs, and other coupling interfaces.

The flexural pivot 100 can include flexures 140*a-d* (i.e., cross blade flexures) rotatably coupling the flexure support members 110, 120, 130 to one another. For example, the flexures 140*a-b* can rotatably couple the first and second flexure support members 110, 120 to one another, and the flexures 140*c-d* can rotatably couple the second and third flexure support members 120, 130 to one another. Thus, the first and second flexure support members 110, 120 can move relative to one another about the first axis 101, and the second and third flexure support members 120, 130 can move relative to one another about the second axis 102, which can provide relative rotation of the flexure first and third support members 110, 130 about two axes or in two degrees of freedom. Two or more flexures can be utilized for a given axis to provide stability for the flexure support members. The second flexure support member 120 moves in only a single degree of freedom with respect to each of the first and third flexure support member 110, 130. The second flexure support member 120 may be referred to as a coupler due to its intermediate relationship with respect to the first and third flexure support members 110, 130 and function coupling the two-axis rotational movement of the flexural pivot 100. In one aspect, the flexural pivot 100 can provide a frictionless pivot coupling between two bodies (i.e., external structures) that can support significant loads during high accelerations and allow large angular travel. In addition, the flexural pivot 100 can be designed such that the masses of all the moving parts are balanced at the same center of gravity. For example, the second flexure support member 120 or coupler can be configured so its center of gravity is at the intersection of both pivot axes 101, 102, which allows its weight to not affect the balancing of the supported or moving mass in both axes.

Figure 2:
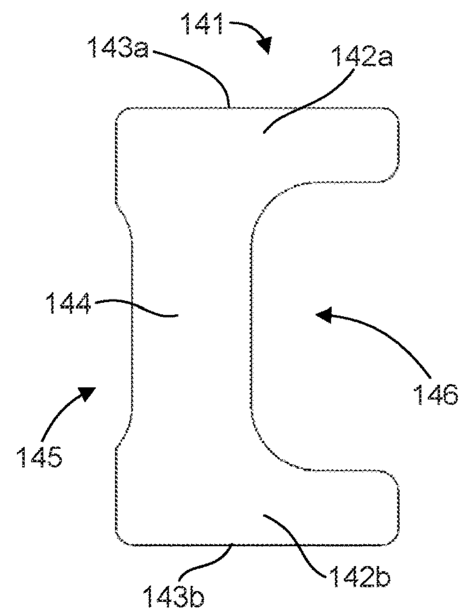
FIG. 2 illustrates a flexible blade unit of the flexural pivot of FIGS. 1A and 1B.

Each flexure 140*a-d* can have two or more flexible blades 141 arranged in a cross configuration. For example, the flexible blades 141 can have a C-shape or configuration. The flexible blades 141 can be oriented with the open sides of the C-shapes facing and oriented about 90 degrees relative to one another to achieve the cross blade configuration. A flexible blade 141 is shown isolated in FIG. 2. The flexible blades 141 can have any suitable dimension, as the principles disclosed herein provide flexural pivot components that are scalable to accommodate a wide range of sizes and applications. In one embodiment, a flexural pivot 100 can have an overall size dimension (e.g., length and/or width) of 1.86 inches, and the flexible blades 141 can have a thickness of 0.012 inches. The flexible blades 141 can be made of any suitable material. In some embodiments, the flexible blade 141 can be made of materials having relatively high yield and fatigue strength, such as steel (e.g., high-carbon spring stainless steel), or titanium (e.g., 6Al-4V).

Figure 3:
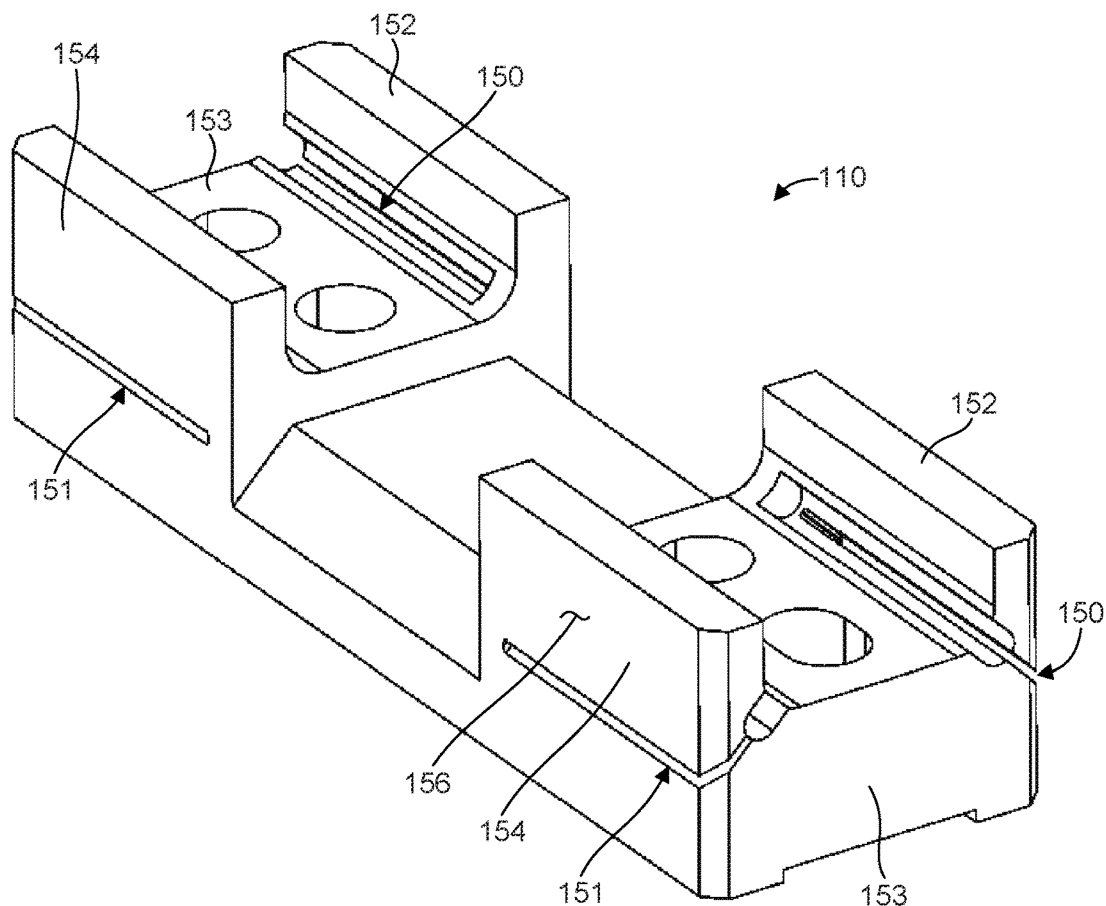
FIG. 3 illustrates a first flexure support member of the flexural pivot of FIGS. 1A and 1B.
Figure 4:
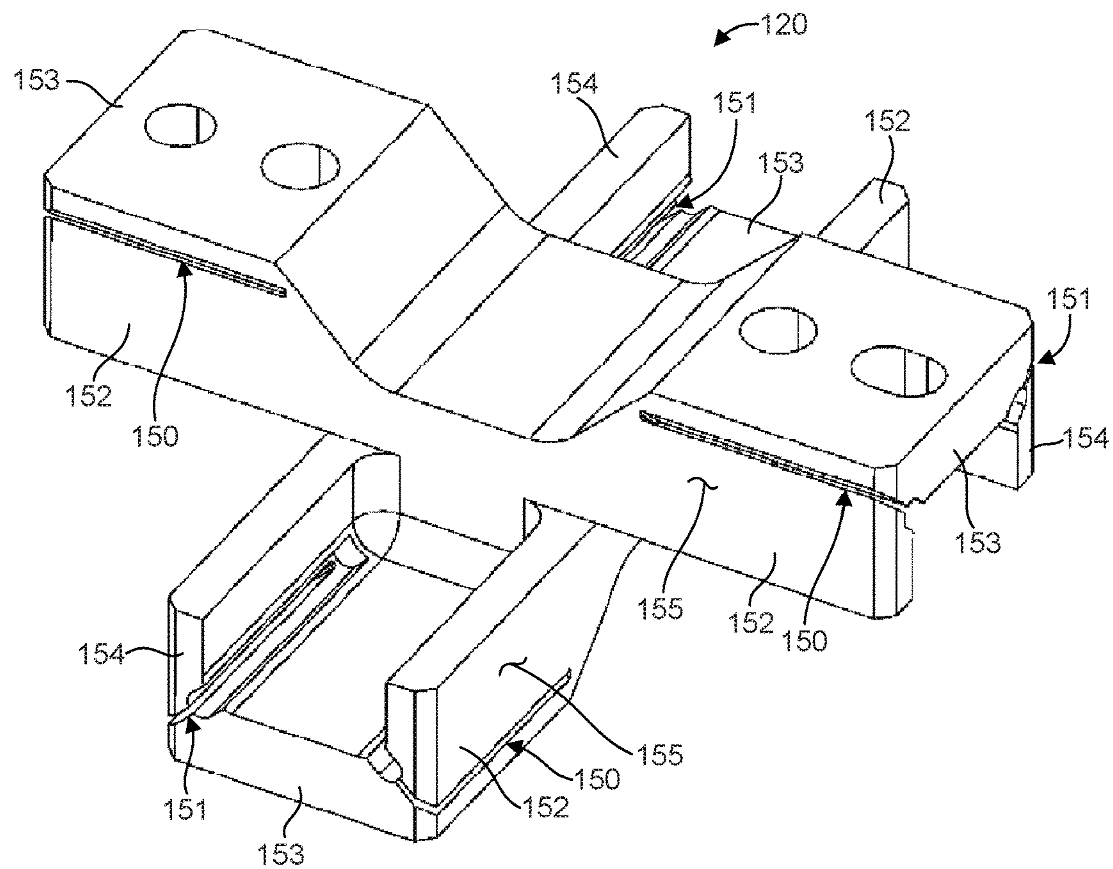
FIG. 4 illustrates a second flexure support member of the flexural pivot of FIGS. 1A and 1B.
Figure 5:
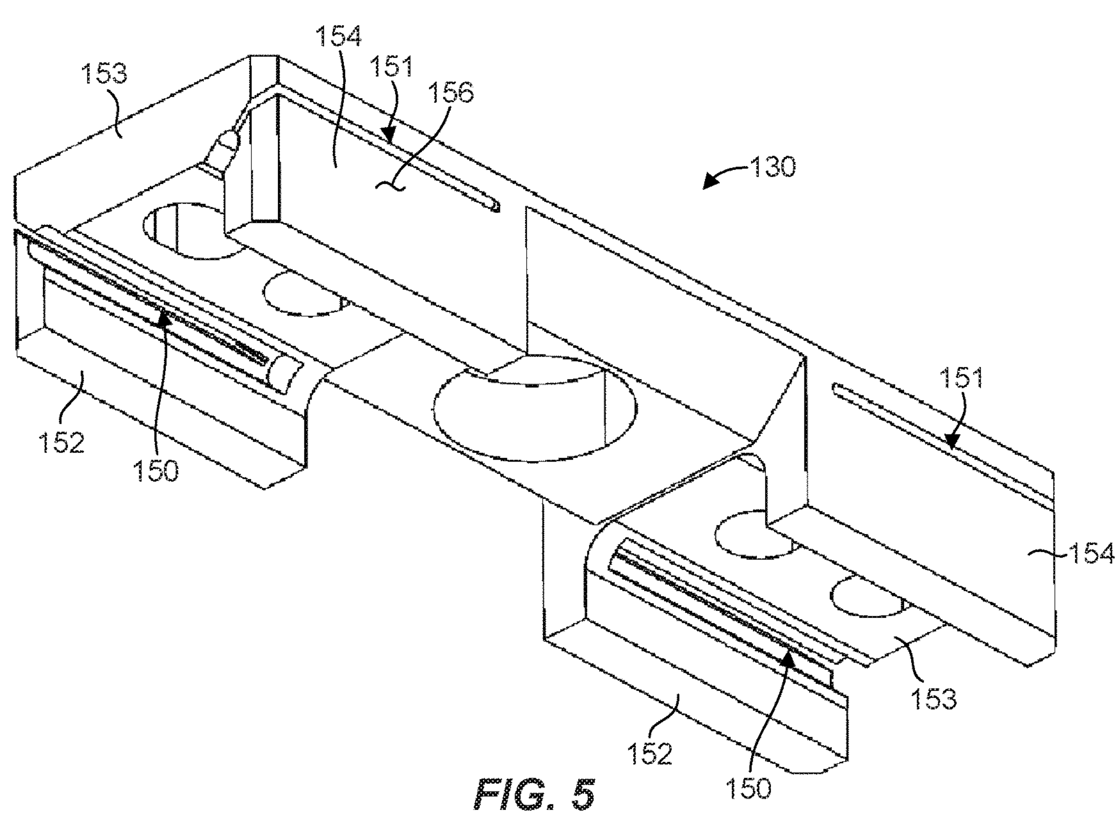
FIG. 5 illustrates a third flexure support member of the flexural pivot of FIGS. 1A and 1B.

Each of the first, second and third flexure support members 110, 120, 130 can have flexure openings 150, 151 defined at least partially by cantilevered extension portions 152-154. The flexure openings 150, 151 can extend through outer side surfaces 155, 156 of the flexure support members 110, 120, 130, which can separate the cantilevered extension portions 152-154 from one another. For clarity, flexure openings 150, 151, cantilevered extension portions 152-154, and outer side surfaces 155, 156 of the first, second and third flexure support members 110, 120, 130 are only identified on portions of the second and third flexure support members 120, 130 in FIGS. 1A and/or 1B. These features are shown in FIGS. 3-5 and identified with the same reference numbers associated with each individually illustrated flexure support member.

The cantilevered extension portions 152-154 separated by the flexure openings 150, 151 can be used to couple the flexible blades 141 to the first, second and third flexure support members 110, 120, 130. The flexible blades 141 can be disposed in the flexure openings 150, 151, which can be configured as slots, such that cantilevered extension portions 152-154 are disposed on opposite sides of coupling portions 142*a*, 142*b* of the flexible blades 141. For example, as shown in FIG. 1B, a flexible blade 141 can be disposed in the flexure opening 150 between the cantilevered extension portions 152, 153 of the third flexure support member 130, such that the cantilevered portions 152, 153 are disposed on opposite sides of a coupling portion 142*a* of the blade. In addition, the same flexible blade 141 can be disposed in the flexure opening 150 between the cantilevered extension portions 152, 153 of the second flexure support member 120, such that the cantilevered portions 152, 153 are disposed on opposite sides of a coupling portion 142*b* of the blade. Each of the flexible blades 141 can be similarly disposed in the other flexure openings of the first and second flexure support members 110, 120.

In one aspect, shown in FIG. 1A, ends 143*a*, 143*b* of the flexible blades 141 can be exposed through the outer side surfaces 155, 156 of the first, second and third flexure support members 110, 120, 130. In this configuration, the exposed ends 143*a*, 143*b* of the flexible blades 141 can be welded to the cantilevered extension portions 152-154 at the outer side surfaces 155, 156 of the first, second and third flexure support members 110, 120, 130. The cantilevered extension portions 152-154 of the first, second and third flexure support members 110, 120, 130 can serve as flexible blade interfaces or supports that constrain or support non-welded portions of the coupling portions 142*a*, 142*b* at opposite ends of the flexible blades 141. The interfaces defining the flexure openings 150, 151 can be precisely formed to engage with the blades 141.

By welding or capturing the outside ends 143*a*, 143*b* or edges of the flexible blades 141, the free length or bending portion 144 between the coupling portions 142*a*, 142*b* of the flexible blades 141 can be precisely controlled, which can provide repeatable and predictable performance of the flexural pivot 100. In addition, with the welds being remotely located from the bending portions 144 (i.e., not welded at junctions of the bending portions 144 and the flexure support members 110, 120, 130), heat affected zones are kept away from the bending portions 144 (which are subject to fatigue), and stress concentrations in the bending portions 144 can be reduced or minimized. Thus, angular travel can be increased for the same bending portion length without failure of the blades. The flexural performance of the blades 141 are therefore not limited by the welded couplings with the first, second and third flexure support members 110, 120, 130. Although welds are not illustrated in FIG. 1A for clarity in showing certain aspects of the present disclosure, the welds can be located in regions identified by reference numbers 157, 158. As illustrated (i.e., without welds), FIG. 1A shows a flexural pivot precursor in accordance with one example of the present disclosure.

In one aspect, the bending portions 144 of the flexible blades 141 can be prevented from contacting adjacent components (e.g., another flexible blade 141 and/or a flexure support member 110, 120, 130 to which the flexible blade is coupled) to facilitate smooth, unrestricted movement of the flexible blades 141 during operation. For example, the bending portions 144 of the flexible blades 141 can be recessed 145, 146 on outer sides of the flexible blades 141 to prevent the bending portions 144 from contacting adjacent components. In other words, an outer edge or surface of the bending portion 144 may not be coplanar or flush with the outer edge or surfaces of the coupling portions 142*a*, 142*b*. In addition, the flexible blades 141 can have a C-shape or configuration to facilitate arranging two flexible blades 141 in a cross configuration while providing bending portions 144 that are offset from one another. For example, the recess 146 can be much larger than the recess 145, thus effectively positioning the bending portion laterally offset with respect to the coupling portions 142*a*, 142*b*. This configuration can maximize the lateral size of the coupling portions 142*a*, 142*b* to improve coupling integrity with the first, second and third flexure support members 110, 120, 130. As shown in FIGS. 1A and 1B, the flexible blades 141 can be substantially identical.

In one aspect, the first, second and third flexure support members 110, 120, 130 can include travel stops 159*a*, 159*b* which can be associated with the cantilevered extension portions 152, 154, to mechanically limit a rotational range of motion of the flexible blades 141. The opposing travel stops 159*a*, 159*b* of the first, second and third flexure support members can be configured to contact one another at the rotational travel limits. The travel stops 159*a*, 159*b* can limit the range of motion to any suitable degree. Typically, the travel stops 159*a*, 159*b* will be configured to prevent excessive bending of the flexible blades 141 that may result in failure (e.g., yielding) of the blades. The travel stops 159*a*, 159*b* can have any suitable configuration or interface surface to contact opposing travel stops. The travel stops 159*a*, 159*b* can be defined at least partially by the outer side surfaces 155, 156 of the flexure support members.

Figure 6A:
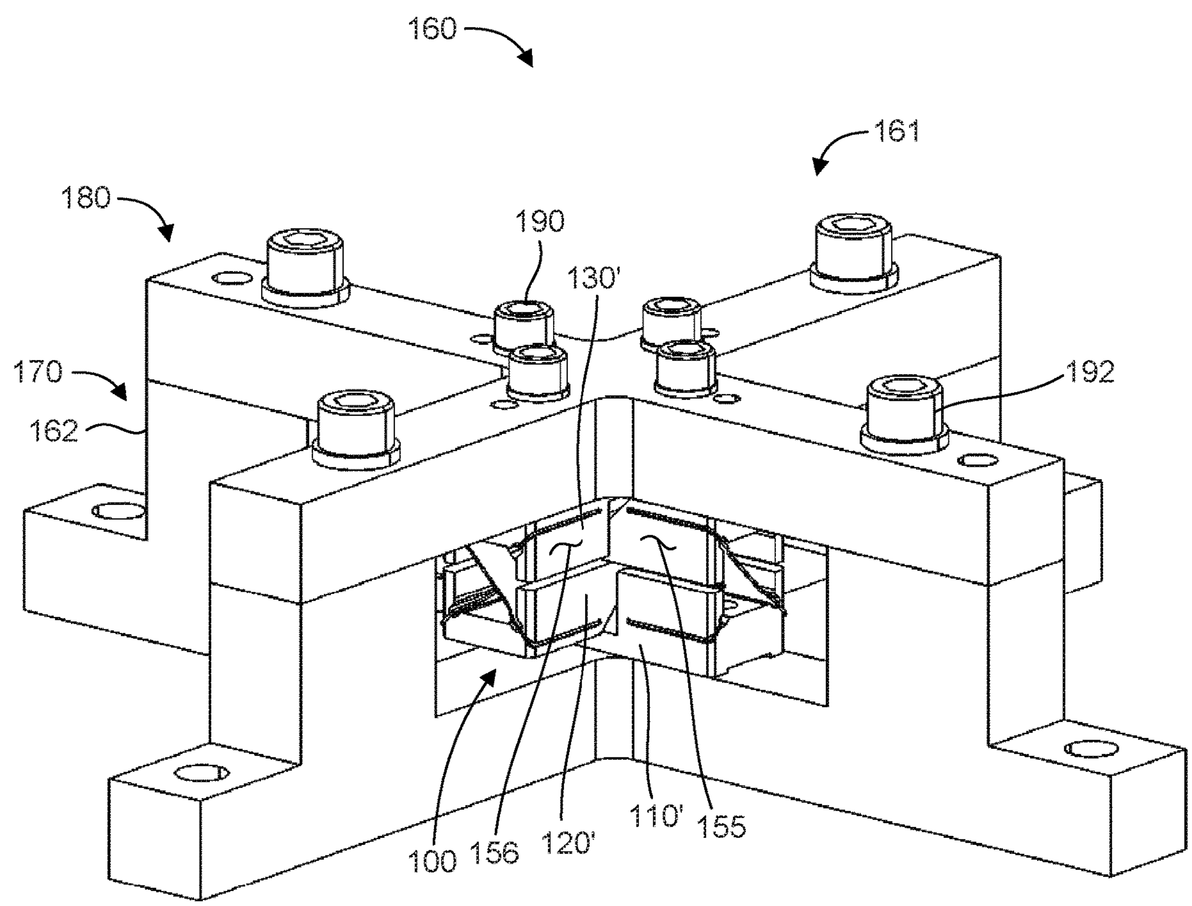
FIG. 6A is an illustration of a flexural pivot manufacturing system in accordance with an example of the present disclosure.
Figure 6B:
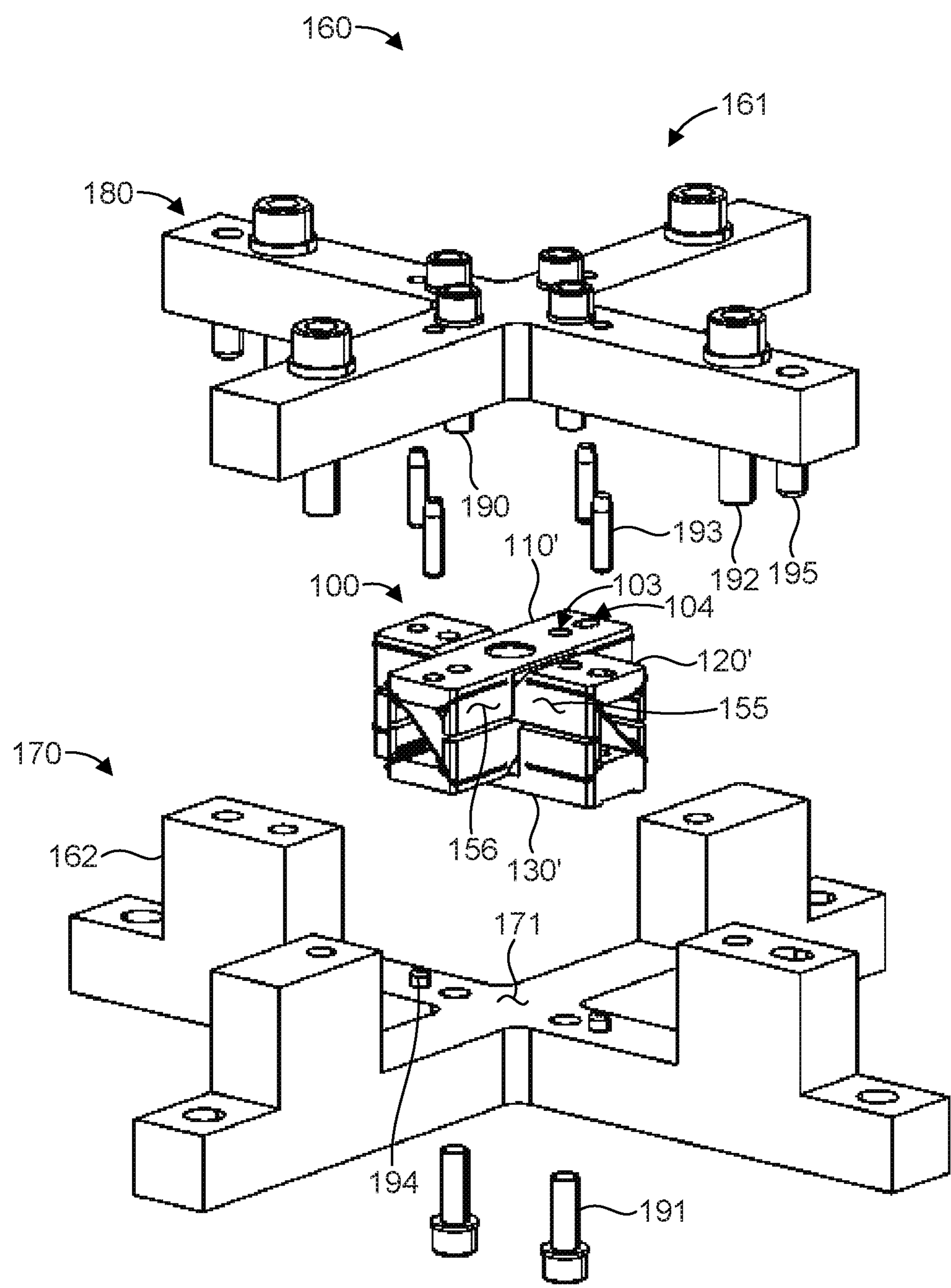
FIG. 6B is an exploded view of the flexural pivot manufacturing system of FIG. 6A.

FIGS. 6A and 6B illustrate a flexural pivot manufacturing system 160 in accordance with an example of the present disclosure. The manufacturing system 160 can include a fixture 161 having a bottom support 170 and a top support 180. The top and bottom supports 180, 170 can be configured to facilitate manufacturing and assembly of a flexural pivot, such as the flexural pivot 100 described above. Thus, the manufacturing system 160 can include flexural pivot support member workpieces 110', 120', 130' coupled to the fixture 161. A complete flexural pivot 100 (excluding welds) is shown in FIGS. 6A and 68 to demonstrate how the fixture 161 can be used to facilitate certain manufacturing and assembly steps in a method for making a flexural pivot 100. Thus, it should be recognized that flexural pivot support member workpieces 110', 120', 130' can be at any suitable stage of manufacture when the fixture 161 is utilized.

Workpieces 110', 120', 130' for manufacturing the three flexure support members 110, 120, 130 can be coupled to and supported by the fixture 161. For example, the flexural pivot support member workpiece 110' that will form the first flexure support member 110 can be supported by and coupled to the bottom support 170. The flexural pivot support member workpiece 130' that will form the third flexure support member 130 can be supported by and coupled to the top support 180. The flexural pivot support member workpiece 120' that will form the second flexure support member 120 can be disposed between the other flexural pivot support member workpieces 110', 130'. The workpiece 120' can be supported by and coupled to the top support 180 and/or the bottom support 170. In the illustrated example, the flexural pivot support member workpiece 120' that will form the second flexure support member 120 is coupled to the top support 180. The flexural pivot support member workpieces 110', 120', 130' can be coupled to the bottom and top supports 170, 180 by fasteners 190, 191 and/or pins 193, 194, which can utilize any suitable coupling interface, such as the holes or openings 103 and/or the slots 104. In addition, the bottom and top supports 170, 180 can be coupled to one another, such as by fasteners 192 and/or pins 195. The pins 193-195 can be used to precisely position the top support 180, the bottom support 170, and/or the various flexural pivot support member workpieces 110', 120', 130' relative to one another. Pivot flexure interface surfaces of the fixture 161, such as the interface surface 171 of the bottom support 170, can be configured to interface with outer (e.g., top and bottom) surfaces of the flexural pivot 100 to mount and support the workpieces 110', 120', 130' during manufacture and assembly.

The fixture 161 can include standoff spacers 162 located at ends of the flexural pivot support member workpieces 110', 120', 130' to position the top and bottom supports 180, 170 relative to one another and thereby position the flexural pivot support member workpieces 110', 120', 130' relative to one another. The standoff spacers 162 can be associated with the top support 180 and/or the bottom support 170. In the illustrated embodiment, the standoff spaces 162 are associated with the bottom support 170. The top and bottom supports 180, 170 of the fixture 161 can have a cross configuration, which is the same general shape as the flexural pivot 100, to expose the outer side surfaces 155, 156 of the flexural pivot support member workpieces 110', 120', 130', which can facilitate formation of the flexure openings, which is described below.

The top and bottom supports 180, 170 of the fixture 161 can be configured to facilitate formation of the flexure openings 150, 151, described above with respect to FIGS. 1A-5, extending through outer side surfaces of the flexural pivot support member workpieces 110', 120', 130' to form the first, second and third flexure support members 110, 120, 130. The flexure openings 150, 151 can be formed in the workpieces 110', 120', 130' in any suitable manner utilizing any suitable process or combination of processes. For example, the flexure openings 150, 151 may be formed in the workpieces 110', 120', 130' by a material removal process, such as machining. Example machining processes include electrical discharge machining (EDM), water jet cutting, milling, etc. A manufacturing process may be selected based on the design objectives, tolerance requirements, cost, etc. A wire EDM process may provide precise machining that can meet tight tolerances and accurately control the flexure openings 150, 151. In one aspect, utilizing a common fixture 161 to support the first, second and third flexure support members 110, 120, 130 can establish and maintain precision mounting relationships during machining or material removal operations that form the flexure openings 150, 151. Thus, flexure openings for a given flexible blade can be formed in the same fixture setup and at the same time to ensure proper alignment of the flexure openings for the flexible blade. This can minimize stresses induced in the blades during assembly due to misalignment, which can provide predictable performance of the pivot flexure. The direction of the cuts can be from the ends toward the center or, in other words, parallel to the axes of rotation 101, 102. As an example, the flexure openings 150 in the second and third flexure support members 120, 130 shown in FIG. 1B can be made simultaneously with the same manufacturing process, such as wire EDM. Cutting or forming the flexure openings 150 (i.e., slots) at the same time can provide good alignment of the flexure openings 150, which will receive opposite ends of the same flexible blade 141. This can reduce or minimize displacement driven stresses in the blades due to misalignment of the flexure openings 150. In one aspect, the first, second and third flexure support members 110, 120, 130 and the fixture 161 can be designed to allow the assembly-level formation of the flexure openings 150, 151 to ensure alignment of the flexure openings 150, 151 for assembly with the flexible blades 141. Once the flexure openings 150, 151 have been formed, the first, second and third flexure support members 110, 120, 130 can be removed from the fixture 161 and cleaned prior to final assembly where the first, second and third flexure support members 110, 120, 130 are again secured in the fixture 161 and receive the flexible blades 141 in the flexure openings 150, 151, as described above with respect to FIGS. 1A-5.

The flexible blades 141 can be manufactured utilizing any suitable process or technique, such as milling, EDM, water jet machining, casting, forging, stamping, photochemical machining (PCM), laser cutting, etc. A wire EDM, PCM, and/or laser cutting process may be utilized to provide accurate control of the part geometry. Final surfaces may be achieved by grinding, honing, polishing, etc. to a desired geometric and/or dimensional tolerance, and/or surface finish.

The top and bottom supports 180, 170 can be configured to facilitate disposing the flexible blades 141 in the flexure openings 150, 151 to rotatably couple the first, second and third flexure support members 110, 120, 130 to one another. For example, the top and bottom supports 170, 180 (including standoff spacers 162) can provide access to sides and/or ends of the first, second and third flexure support members 110, 120, 130 to facilitate disposing the flexible blades 141 in the flexure openings 150, 151 of the first, second and third flexure support members 110, 120, 130. By providing sufficient space about the sides and/or ends of the first, second and third flexure support members 110, 120, 130, the flexible blades 141 can be inserted into the flexure openings 150, 151. In addition, supporting the first, second and third flexure support members 110, 120, 130 in the fixture 161 can align the flexure openings 150, 151 to facilitate stress-free assembly of the blades 141.

With the first, second and third flexure support members 110, 120, 130 fixtured and the flexible blades 141 disposed in the flexure openings 150, 151 as illustrated in FIGS. 1A and 1B, the exposed ends **143*a*, 143*b* can be welded to the first, second and third flexure support members 110, 120, 130 (i.e., the cantilevered extension portions 152-154), such as at weld locations 157, 158. Thus, the top and bottom supports 180, 170 can be configured to facilitate coupling the flexible blades 141 to the first, second and third flexure support members 110, 120, 130, such as by providing access to the sides of the first, second and third flexure support members 110, 120, 130 by a welding instrument. Any suitable type of weld process may be utilized, such as electron beam welding. Welding of the flexible blades 141 to the first, second and third flexure support members 110, 120, 130 in the same fixture 161 can ensure precision welds and proper alignment of the blades as they are welded. In one aspect, the flexural pivot 100 can be annealed following welding. The first, second and third flexure support members 110, 120, 130 can be made of any suitable material, such as titanium or steel. The first, second and third flexure support members 110, 120, 130 and the flexible blades 141** can be made of like materials to facilitate welding.

It is noted that no specific order is required in the methods disclosed herein, though generally in some embodiments, method steps can be carried out sequentially.

Figure 7:
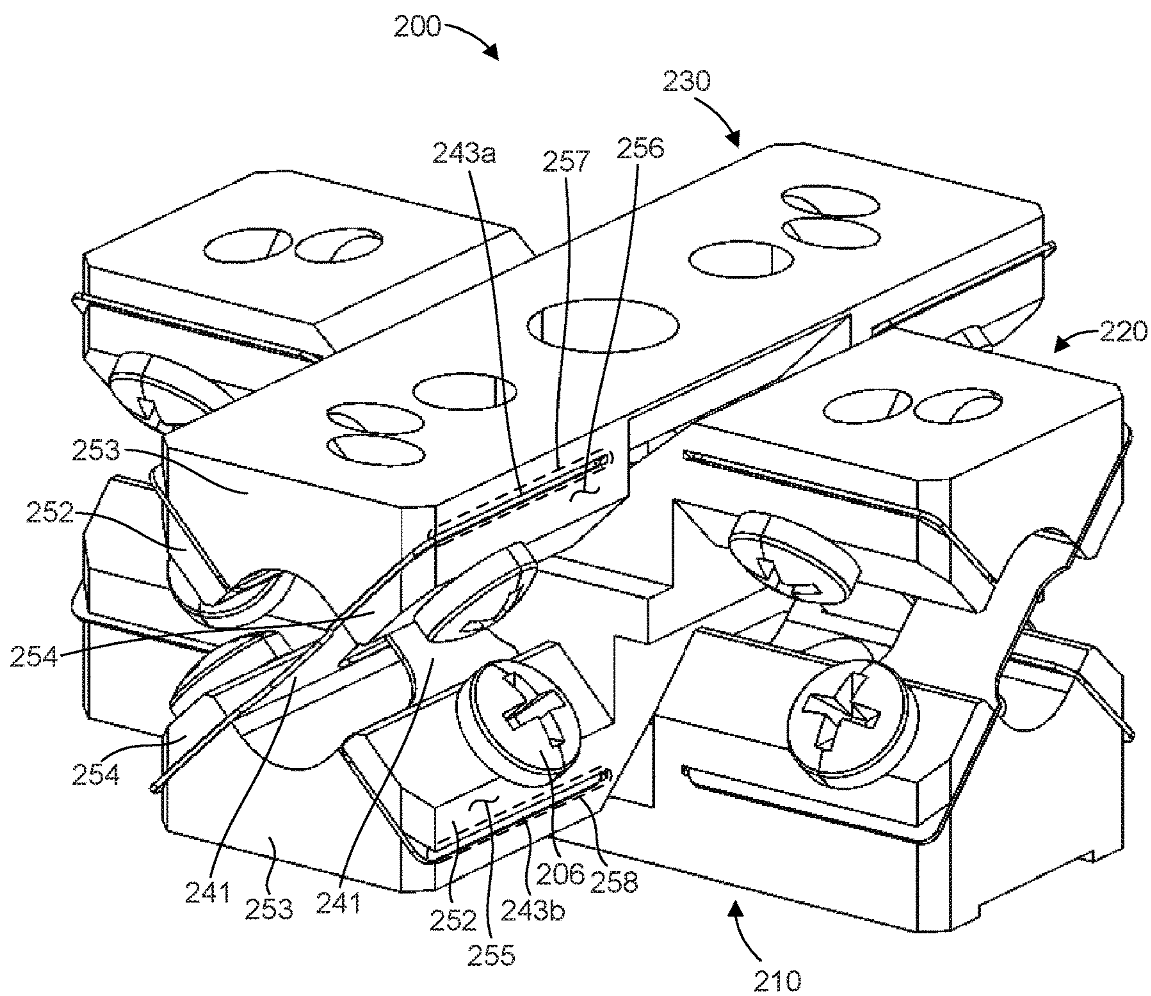
FIG. 7 is an illustration of a flexural pivot in accordance with another example of the present disclosure.
Figure 8:
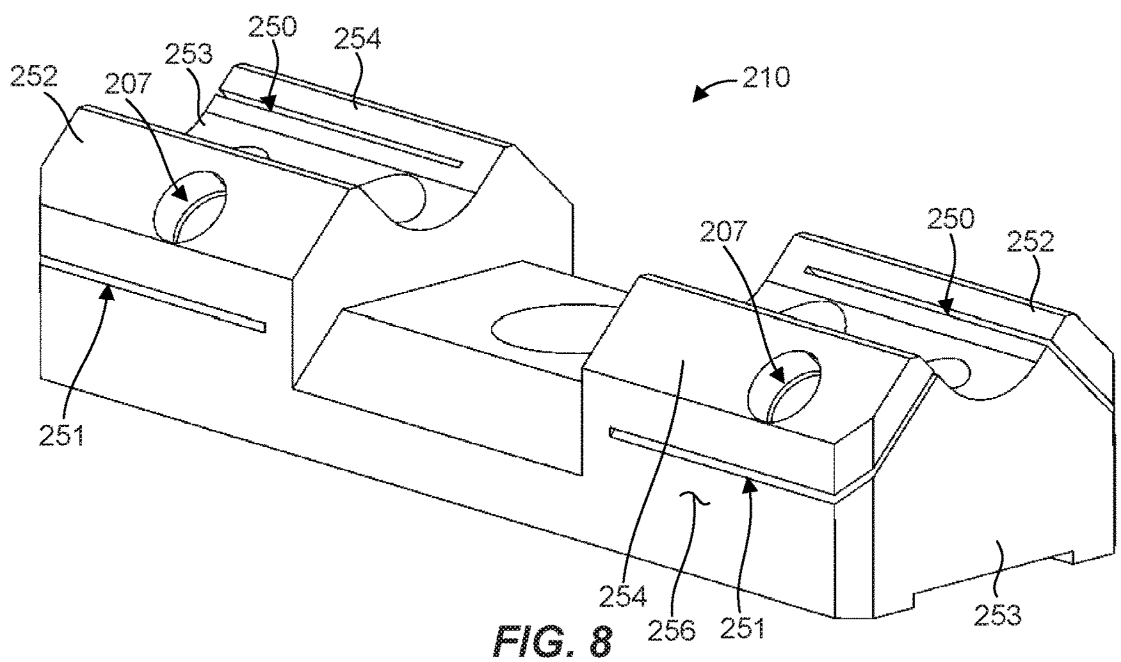
FIG. 8 illustrates a first flexure support member of the flexural pivot of FIG. 7.
Figure 9:
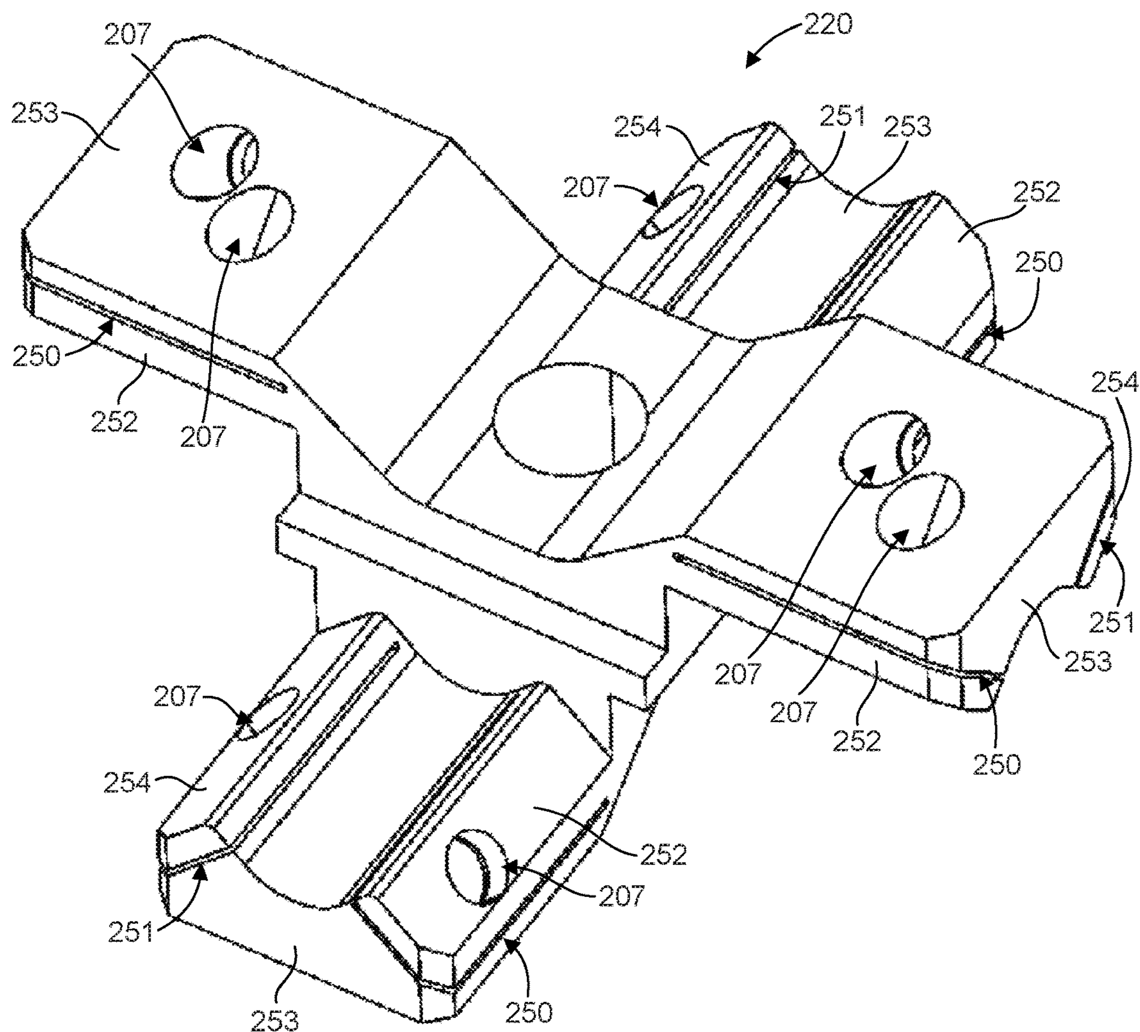
FIG. 9 illustrates a second flexure support member of the flexural pivot of FIG. 7.
Figure 10:
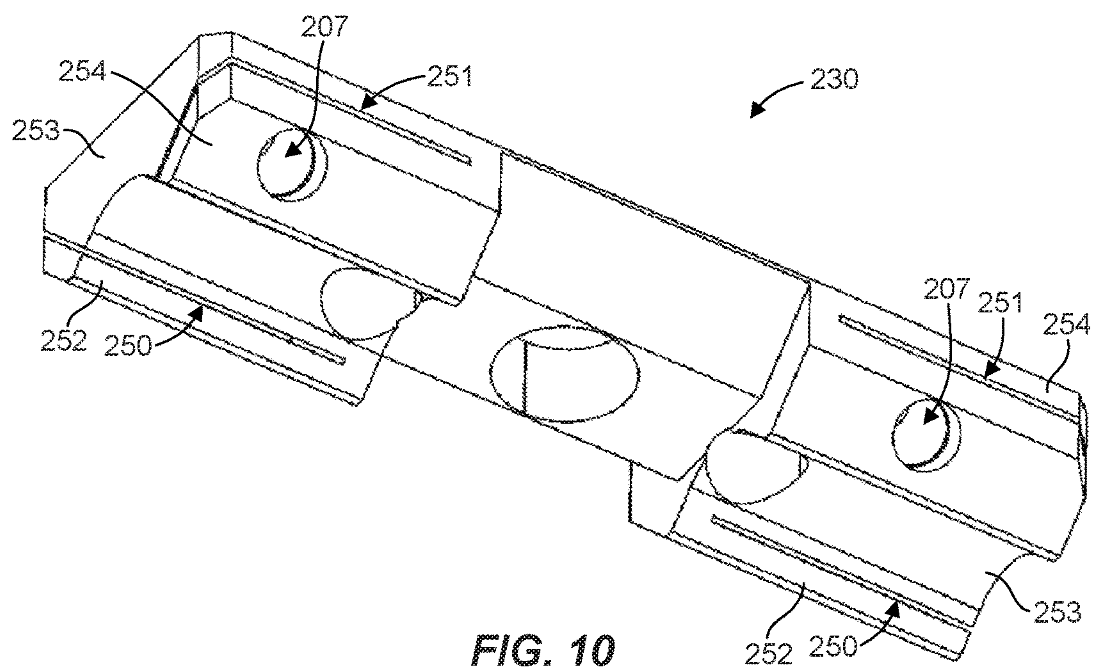
FIG. 10 illustrates a third flexure support member of the flexural pivot of FIG. 7.

FIG. 7 illustrates a flexural pivot 200 in accordance with another example of the present disclosure. The flexural pivot 200 is similar in many respects to the flexural pivot 100 described above with respect to FIGS. 1A-5. For example, the flexural pivot 200 can comprise first, second and third flexure support members 210, 220, 230 rotatably coupled to one another by flexures (i.e., cross blade flexures) that each include two or more flexible blades 241 arranged in a cross configuration. The first, second and third flexure support members 210, 220, 230 are shown individually in FIGS. 8-10, respectively. Each first, second and third flexure support member 210, 220, 230 can have flexure openings 250, 251 defined at least partially by cantilevered extension portions 252-254. The flexure openings 250, 251 can extend through outer side surfaces 255, 256 of the first, second and third flexure support members 210, 220, 230. The flexure openings 250, 251 are obscured from view in FIG. 7 but are visible in the figures illustrating the individual flexure support members and identified with the same reference numbers associated with each individually illustrated flexure support member. For clarity, cantilevered extension portions 252-254 and outer side surfaces 255, 256 of the first, second and third flexure support members 210, 220, 230 are only identified on portions of the second and third flexure support members 220, 230 in FIG. 7. These features are shown in FIGS. 8-10 and identified with the same reference numbers associated with each individually illustrated flexure support member. As in the flexural pivot 100, the cantilevered extension portions 252-254 of the flexural pivot 200 can be used to couple the flexible blades 241 to the first, second and third flexure support members 210, 220, 230.

In this case, the flexible blades 241 are clamped to the first, second and third flexure support members 210, 220, 230 by the cantilevered extension portions 252-254. For example, fasteners 206 (e.g., screws, bolts, etc.) can extend at least partially through the cantilevered extension portions 252-254 to clamp the flexible blades 241. Thus, the cantilevered extension portions 252-254 can have openings 207, which may be threaded accordingly, to receive the fasteners 206. The openings or holes 207 can be countersunk, as desired, to accommodate a fastener head. The flexible blades 241 can also include holes or openings to facilitate passage of the fasteners 206 through the flexible blades. The cantilevered extension portions 252-254 can therefore serve as cantilevered clamps to couple the flexible blades 241 to the flexure support members 210, 220, 230.

In one aspect, exposed ends 243*a*, 243*b* of the flexible blades 241 can be welded to the cantilevered extension portions 252-254 at the outer side surfaces 255, 256 of the first, second and third flexure support members 210, 220, 230. Although welds are not illustrated in FIG. 7 for clarity in showing certain aspects of the present disclosure, the welds can be located in regions identified by reference numbers 257, 258. Welds can be included to add strength to the clamped couplings. For example, the fasteners 206 can clamp the flexible blades 241 and the welds can improve in-plane strength. Thus, fasteners 206 and welds can be utilized to handle high loading conditions. In one aspect, the flexural pivot 200 can be made using the fixture 161 as described above with respect to FIGS. 6A and 6B. In addition, because the bending portion of the blade 241 does not terminate at the welds, the welds do not experience bending stress.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A flexural pivot, comprising:

three flexure support members, each flexure support member having a plurality of flexure openings defined at least partially by a cantilevered extension portion; and at least one flexure operable to rotatably couple the plurality of flexure support members to one another, the at least one flexure comprising first and second flexible blades arranged in a cross configuration, wherein the first and second flexible blades are disposed in the flexure openings of the flexure support members, and the cantilevered extension portions, at least in part, couple the first and second flexible blades to the flexure support members, wherein ends of the flexible blades are welded to the cantilevered extension portions at outer side surfaces of the flexure support members such that the welds are contained by the flexure support members and do not extend to inner side surfaces of the flexure support members opposite the outer side surfaces, wherein a first flexure support member and a second flexure support member are configured to be rotatable relative to one another about a first axis, and the second flexure support member and a third flexure support member are configured to be rotatable relative to one another about a second axis, and wherein the first and second axes are perpendicular to one another.

2. The flexural pivot of claim 1, wherein the flexible blades are clamped to the flexure support members by the cantilevered extension portions.

3. The flexural pivot of claim 2, further comprising fasteners extending through the cantilevered extension portions to clamp the flexible blades.

4. The flexural pivot of claim 1, wherein two flexure support members are configured to be rotatably coupled to one another via two flexures.

5. The flexural pivot of claim 1, wherein the first flexure support member and the second flexure support member are configured to be rotatably coupled to one another via two flexures, and the second flexure support member and the third flexure support member are configured to be rotatably coupled to one another via two flexures.

6. The flexural pivot of claim 1, wherein the flexure openings are configured as slots.

7. The flexural pivot of claim 1, wherein the flexure support members comprise travel stops to limit a range of rotational movement.

8. The flexural pivot of claim 7, wherein the travel stops are associated with cantilevered extension portions.

9. A method of making a flexural pivot, comprising:

coupling three flexural pivot support member workpieces to a fixture, wherein a first flexural pivot support member workpiece is coupled to a bottom support of the fixture, a second flexural pivot support member workpiece is coupled to a top support of the fixture, and a third flexural pivot support member workpiece is disposed between the first and second flexural pivot support member workpieces, the third flexural pivot support member workpiece being supported by and coupled to at least one of the top support and the bottom support;

coupling the top and bottom supports to one another;

forming flexure openings in the flexural pivot support member workpieces that extend through outer side surfaces of the flexure support member workpieces to form three flexure support members and cantilevered extension portions of the flexure support members;

disposing at least one flexure in the flexure openings of the flexure support members to rotatably couple the flexure support members to one another, wherein the at least one flexure has first and second flexible blades arranged in a cross configuration and ends of the flexible blades are exposed through the outer side surfaces of the flexure support members; and coupling the at least one flexure to the flexure support members wherein ends of the flexible blades are welded to the cantilevered extension portions at outer side surfaces of the flexure support members such that the welds are contained by the flexure support members and do not extend to inner side surfaces of the flexure support members opposite the outer side surfaces, wherein a first flexure support member and a second flexure support member are configured to be rotatable relative to one another about a first axis, and the second flexure support member and a third flexure support member are configured to be rotatable relative to one another about a second axis, and wherein the first and second axes are perpendicular to one another.

10. The method of claim 9, wherein the flexure openings are configured as slots.

11. The method of claim 9, wherein forming the flexure openings comprises removing material from the flexure support members.

12. The method of claim 11, wherein removing material from the flexure support members comprises performing an electrical discharge machining (EDM) operation.

13. The method of claim 11, wherein at least some of the flexure openings of the flexure support members are formed in the same material removal operation.

14. The method of claim 9, further comprising fastening the at least one flexure to the flexure support members.

15. The method of claim 14, wherein fasteners extend through the cantilevered extension portions to clamp the flexible blades.

16. The method of claim 9, wherein the first and second flexural pivot support member workpieces are coupled to the bottom and top supports, respectively, by fasteners.

17. The method of claim 9, wherein the top and bottom supports of the fixture have a cross configuration to expose the outer side surfaces of the flexural pivot support member workpieces to facilitate formation of the flexure openings.

18. The method of claim 9, wherein the top and bottom supports of the fixture have a cross configuration to expose the outer side surfaces of the flexural pivot support member workpieces to facilitate welding the ends of the flexible blades to the cantilevered extrusion portions.

19. The method of claim 9, wherein the fixture comprises standoff spacers located at ends of the flexural pivot support member workpieces to position the top and bottom supports relative to one another and thereby position the flexural pivot support member workpieces relative to one another.

20. The method of claim 19, wherein the standoff spacers are associated with at least one of the top support and the bottom support.

* * * * *